(12) United States Patent
Kim et al.

(10) Patent No.: US 11,418,970 B2
(45) Date of Patent: Aug. 16, 2022

(54) METHOD FOR TRANSMITTING AND RECEIVING SIGNALS RELATED TO QOS PREDICTION IN A WIRELESS COMMUNICATION SYSTEM AND APPARATUS THEREFOR

(71) Applicant: LG ELECTRONICS INC., Seoul (KR)

(72) Inventors: Laeyoung Kim, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 16/532,464

(22) Filed: Aug. 5, 2019

(65) Prior Publication Data
US 2020/0045559 A1 Feb. 6, 2020

(30) Foreign Application Priority Data

Aug. 3, 2018 (KR) .................. 10-2018-0090859

(51) Int. Cl.
| | |
|---|---|
| *H04W 16/22* | (2009.01) |
| *H04B 7/06* | (2006.01) |
| *H04W 28/02* | (2009.01) |
| *H04W 24/10* | (2009.01) |
| *H04L 1/00* | (2006.01) |
| *H04W 28/04* | (2009.01) |

(52) U.S. Cl.
CPC .......... *H04W 16/22* (2013.01); *H04B 7/0632* (2013.01); *H04L 1/0026* (2013.01); *H04W 24/10* (2013.01); *H04W 28/0236* (2013.01); *H04W 28/0268* (2013.01); *H04W 28/04* (2013.01)

(58) Field of Classification Search
CPC .... H04B 7/0632; H04L 1/0026; H04W 16/22; H04W 24/10; H04W 28/0236; H04W 28/0268; H04W 28/04; H04W 48/18
See application file for complete search history.

(56) References Cited

U.S. PATENT DOCUMENTS

| | | | |
|---|---|---|---|
| 2013/0028114 A1 | 1/2013 | Gutierrez et al. | |
| 2015/0304990 A1 | 10/2015 | Manpuria et al. | |
| 2017/0026983 A1* | 1/2017 | Murakami | ............ H04L 5/0035 |
| 2017/0104688 A1* | 4/2017 | Mirahsan | ............ H04L 41/0896 |

(Continued)

FOREIGN PATENT DOCUMENTS

KR 101329163 11/2013

OTHER PUBLICATIONS

Huawei, HiSilicon et al., "Use Case: NWDA-assisting E2E QoS Assurance," S2-183941, SA WG2 Meeting #127, Sanya, China, dated Apr. 16-20, 2018, 6 pages (Continued)

*Primary Examiner* — Omer S Mian
*Assistant Examiner* — Bao G Nguyen
(74) *Attorney, Agent, or Firm* — Fish & Richardson P.C.

(57) ABSTRACT

A method of transmitting and receiving a signal related to quality of service (QoS) prediction by a server in a wireless communication system includes transmitting a request related to QoS prediction subscription to a network data analytics function (NWDAF) by the server, and receiving a notification related to QoS prediction from the NWDAF by the server. The request includes a QoS requirement related to the QoS prediction.

12 Claims, 11 Drawing Sheets

(56) References Cited

U.S. PATENT DOCUMENTS

2017/0272972 A1\* 9/2017 Egner ............... H04W 28/0268
2018/0262924 A1\* 9/2018 Dao ................. H04W 72/1257

OTHER PUBLICATIONS

Huawei, HiSilicon, "Update Solution for Key Issue 5: NWDAF-Assisted QoS Profile Provisioning," S2-186671, SA WG2 Meeting #128, Vilnius, Lithuania, dated Jul. 2-6, 2018, 7 pages.
PCT International Search Report in International Application No. PCT/KR2019/009735, dated Nov. 7, 2019, 22 pages (with English translation).

\* cited by examiner

METHOD FOR TRANSMITTING AND RECEIVING SIGNALS RELATED TO QOS PREDICTION IN A WIRELESS COMMUNICATION SYSTEM AND APPARATUS THEREFOR

CROSS-REFERENCE TO RELATED APPLICATION

This application claims the benefit of Korean Application No. 10-2018-0090859, filed on Aug. 3, 2018. The disclosures of the prior application is incorporated by reference in its entirety.

TECHNICAL FIELD

The present disclosure relates to a wireless communication system, and more particularly, to a method and apparatus for supporting efficient quality of service (QoS) prediction.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Wireless communication systems adopt various radio access technologies (RATs) such as long term evolution (LTE), LTE-advanced (LTE-A), and wireless fidelity (WiFi). $5^{th}$ generation (5G) is one of them. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, and media and entertainment applications in the cloud or augmented reality (AR). Data is one of the key drivers for 5G and in the 5G era, we may see no dedicated voice service for the first time. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in greater detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DISCLOSURE

Technical Problem

An aspect of the present disclosure is to provide a method of efficiently supporting quality of service (QoS) prediction.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting and receiving a signal related to quality of service (QoS) prediction by a server in a wireless communication system includes transmitting a request related to QoS prediction subscription to a network data analytics function (NWDAF) by the server, and receiving a notification related to QoS prediction from the NWDAF by the server. The request includes a QoS requirement related to the QoS prediction.

In another aspect of the present disclosure, a server for transmitting and receiving a signal related to QoS prediction in a wireless communication system includes a memory and at least one processor coupled to the memory. The at least one processor is configured to transmit a request related to QoS prediction subscription to an NWDAF, and receive a notification related to QoS prediction from the NWDAF. The request includes a QoS requirement related to the QoS prediction.

The QoS requirement may include at least one of a QoS packet delay budget (PDB), a packet error rate (PER), or a guaranteed bit rate (GBR).

The request may include information about a region for the QoS prediction.

The information about the region may be at least one of route information, geographical area information, or coordinate information about the region.

The request may include QoS-related threshold level information.

The threshold level information may include a QoS key performance indicator (KPI).

The notification may include at least one of information about a region in which QoS is changed or information about a time when QoS is changed.

Advantageous Effects

According to the present disclosure, QoS prediction and notification are performed based on information about a region, a time, and so on. Therefore, QoS prediction may be supported more efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings.

BEST MODE FOR CARRYING OUT THE INVENTION

Figure 1:
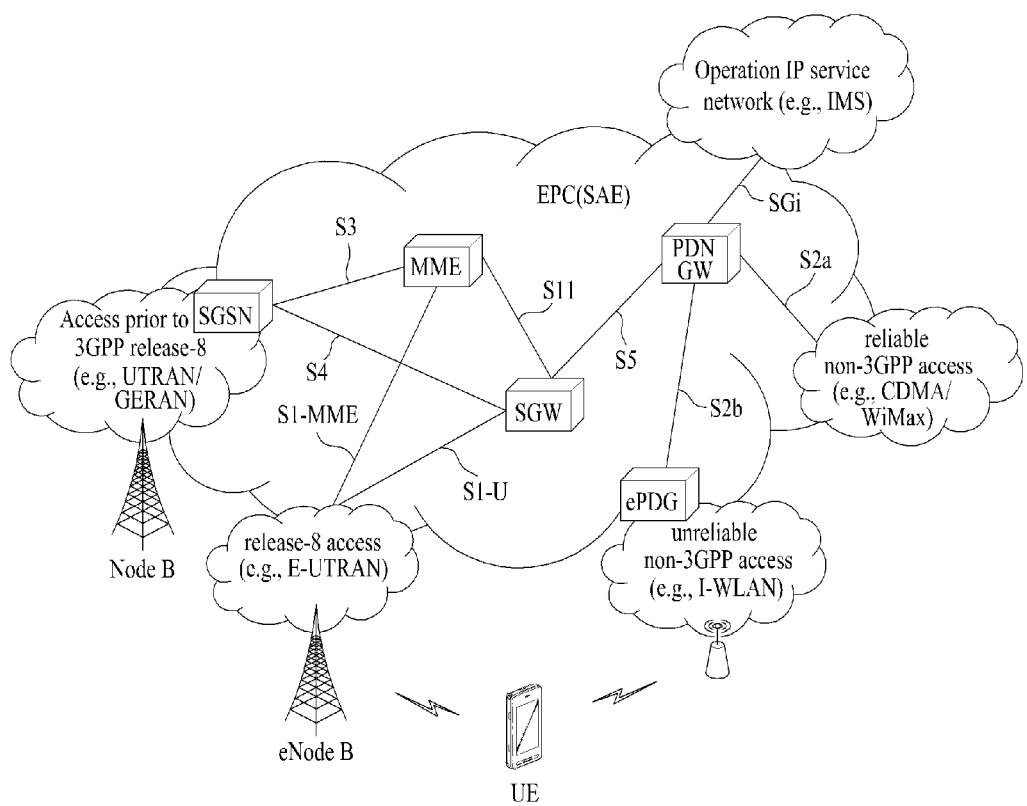
FIG. 1 is a schematic diagram illustrating the structure of an evolved packet system (EPS) including an evolved packet core (EPC)

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present disclosure is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
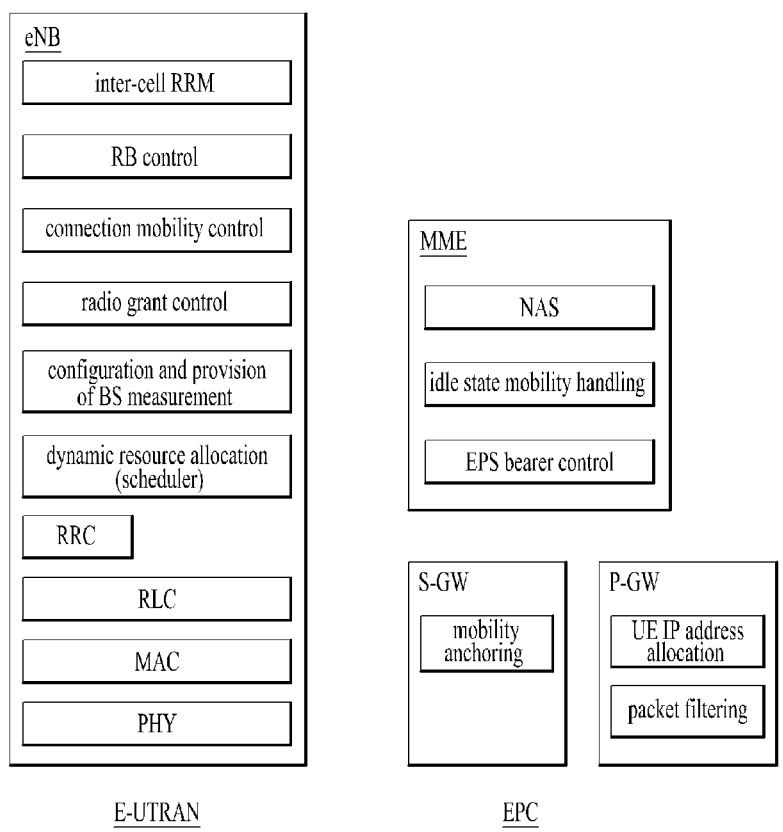
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
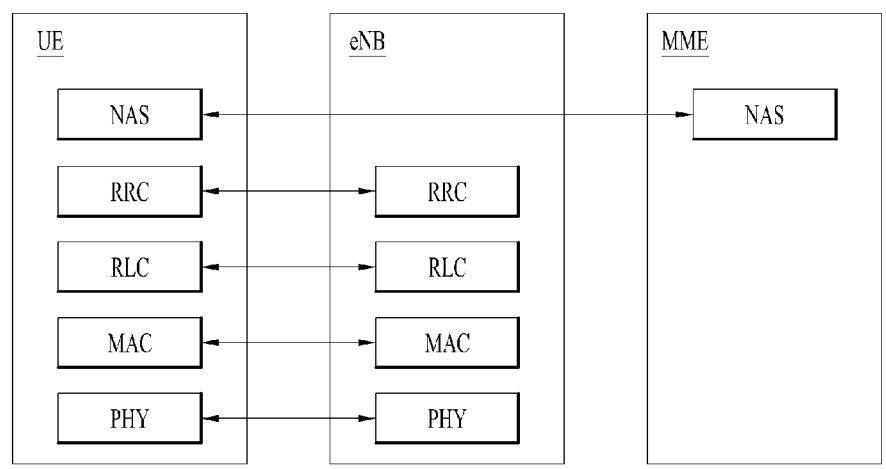
FIG. 3 is a diagram illustrating the structure of a radio interface protocol in a control plane.
Figure 4:
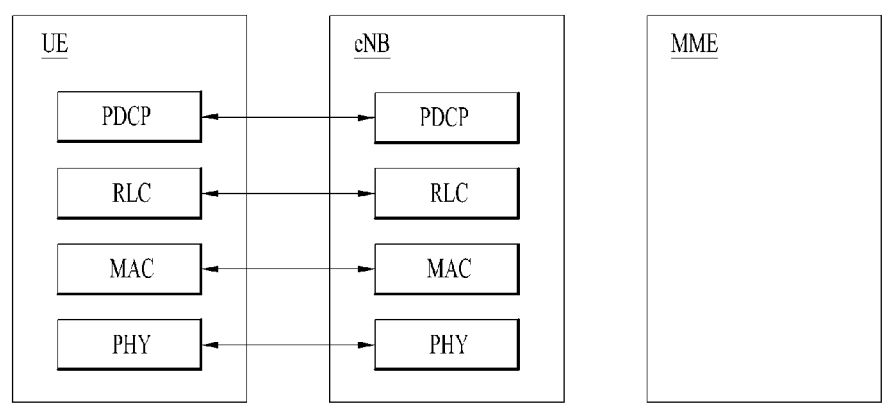
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one identifier (ID). This ID is called an EPS bearer ID. One EPS bearer has QoS characteristics of a maximum bit rate (MBR) and/or a guaranteed bit rate (GBR).

Figure 5:
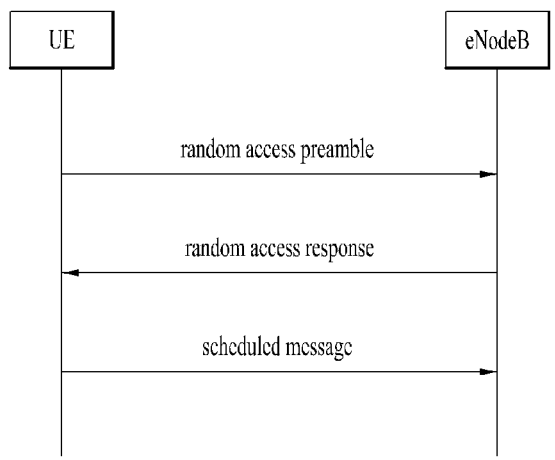
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
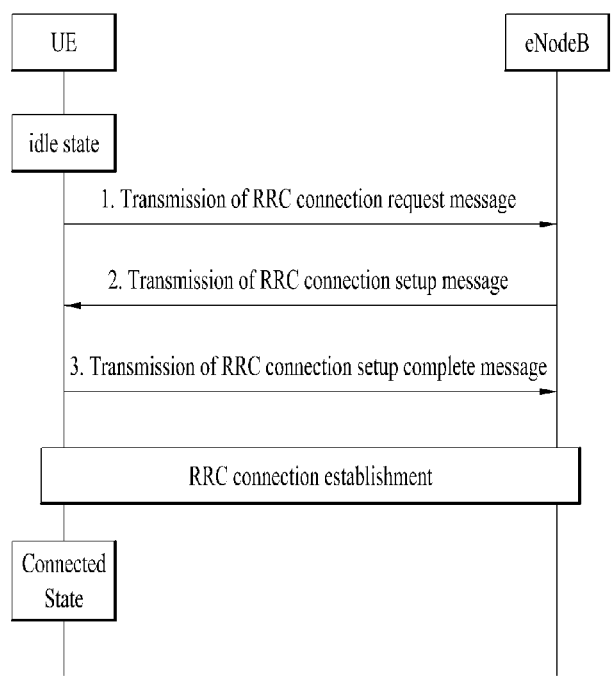
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
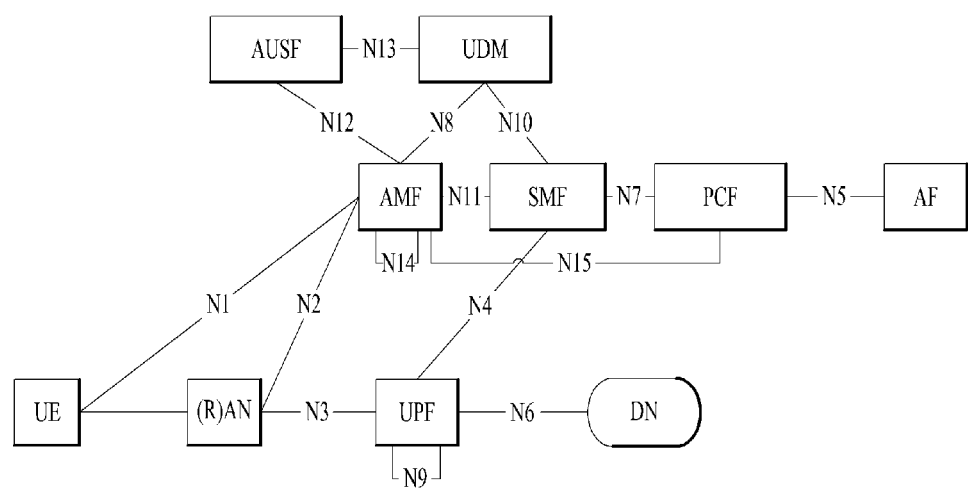
FIG. 7 is a diagram illustrating a $5^{th}$ generation (5G) system.

The functionality of the MME in the legacy EPC is decomposed into the access and mobility management function (AMF) and the session management function (SMF) in the next generation system (or 5G core network (CN)). The AMF carries out NAS interaction with a UE and mobility management (MM), whereas the SMF carries out session management (SM). The SMF also manages a gateway, user plane function (UPF), which has the user-plane functionality, that is, routes user traffic. It may be considered that the SMF and the UPF implement the control-plane part and user-plane part of the S-GW and the P-GW of the legacy EPC, respectively. To route user traffic, one or more UPFs may exist between a RAN and a data network (DN). That is, for 5G implementation, the legacy EPC may have the configuration illustrated in FIG. 7. In the 5G system, a protocol data unit (PDU) session has been defined as a counterpart to a PDN connection of the legacy EPS. A PDU session refers to association between a UE and a DN, which provides a PDU connectivity service of an Ethernet type or an unstructured type as well as an IP type. The unified data management (UDM) performs the same functionality as the HSS of the EPC, and the policy control function (PCF) performs the same functionality as the policy and charging rules function (PCRF) of the EPC. Obviously, the functionalities may be extended to satisfy the requirements of the 5G system. For details of the architecture, functions, and interfaces of a 5G system, TS 23.501 is conformed to.

The 5G system is being worked on in TS 23.501 and TS 23.502. Accordingly, the technical specifications are conformed to for the 5G system in the present disclosure. Further, TS 38.300 is conformed to for details of NG-RAN-related architecture and contents. As the 5G system also supports non-3GPP access, section 4.2.8 of TS 23.501 describes architecture and network elements for supporting non-3GPP access, and section 4.12 of TS 23.502 describes procedures for supporting non-3GPP access. A representative example of non-3GPP access is WLAN access, which may include both a trusted WLAN and an untrusted WLAN. The AMF of the 5G system performs registration management (RM) and connection management (CM) for non-3GPP access as well as 3GPP access. As such, the same AMF serves a UE for 3GPP access and non-3GPP access belonging to the same PLMN, so that one network function may integrally and efficiently support authentication, mobility management, and session management for UEs registered through two different accesses.

On the other hand, section 5.27 of TR 22.886v16.0.0 describes QoS aspects of advanced driving. Particularly, section 5.27.6 describes scenarios and requirements for supporting automated driving in the following multi-PLMN environment. As a vehicle UE travels, a PLMN may change. In this case, the UE should also be provided with service continuity. In addition, the UE may receive, from the network, information indicating whether QoS for a vehicle to everything (V2X) service (e.g., automated driving) may be guaranteed in a region ahead of the UE on a traveling path, that is, for the region in which the UE is scheduled to travel. Even though the PLMN is changed, such QoS prediction should be provided.

Accordingly, a method of efficiently supporting QoS prediction is proposed as follows in relation to the above description. The proposed method of efficiently supporting QoS prediction in a 3GPP 5G system (a 5G mobile communication system or a next-generation mobile communication system) according to the present disclosure includes a combination of one or more of the following operations/configurations/steps. Particularly, the proposed method of the present disclosure is useful for, but not limited to, a V2X service. In the present disclosure, the term V2X service is used interchangeably with V2X application, V2X message, V2X traffic, V2X data, and so on. In relation to the V2X service, a UE may be any of various UEs such as a pedestrian UE as well as a vehicle UE. In the present disclosure, QoS may be QoS for PC5 communication and/or QoS for Uu communication. In the present disclosure, a PLMN may be interpreted as a mobile network operator (MNO). In addition, unlike an EPS, the name of an interface for device to device (D2D) communication may not be PC5 in the 5G system. In this case, the present disclosure may be understood by applying a newly defined interface name for D2D communication.

Embodiment

A server/application function (AF) may transmit a request related to QoS prediction subscription to a network data analytics function (NWDAF), which is a function of transmitting and receiving a signal related to quality of service (QoS) prediction according to an embodiment of the present disclosure (Stepn2). The server/AF may receive a notification related to QoS prediction from the NWDAF. That is, when the NWDAF should/need to notify the AF, the NWDAF notifies the AF of an event (Step 3).

The request may include a QoS requirement related to QoS prediction. The QoS requirement may include one or more of a QoS packet delay budget (PDB), a packet error rate (PER), and a guaranteed bit rate (GBR). The request may further include QoS-related threshold level information, and the threshold level information may include a QoS key performance indicator (KPI). More specifically, the request may include: 1) information indicating whether QoS is satisfied for PC5 (this information may include additional QoS-related values to be satisfied, QoS level information, and so on), 2) information indicating whether Uu connectivity or network connectivity is supported, 3) information indicating whether network coverage is possible, and 4) information indicating whether QoS is satisfied for Uu (this information may include additional QoS-related values to be satisfied, QoS level information, and so on). For a V2X service, the AF may be a V2X application server or a V2X control function. The information indicating whether QoS is satisfied may be subdivided to various specific KPI units representing QoS, for example, latency (or PDB), reliability (or PER), GBR, and so on.

Further, the request may include information about a region for QoS prediction. The information about the region may be at least one of route information, geographical area information, or coordinate information about the region. That is, the AF may include the information about the region in the subscription request. The information about the region may include various pieces of information as follows. The information about the region may be interpreted eventually as information about a region requiring QoS prediction.

i) Departure and destination locations of the UE.
  ii) Information about the region for which the UE requests QoS prediction.
  iii) A current location of the UE and a location at which the requested QoS prediction is terminated.

The information about the region requiring QoS prediction may be coordinate information, address information, road information, tracking area (TA) information, cell ID information, or the like. Particularly regarding ii), there may be a plurality of pieces of such information, thus defining the range of the region. The information about the region applies through the present disclosure. In the above description, a region may be interpreted as a location, a zone, or the like.

Further, the AF may include, in the request, information requesting (immediate) notification of how far from the departure location and/or how long after the departure time the requested event is satisfied. The information may include the distance information and/or the time information. For example, if the AF requests the NWDAF to monitor the event of PC5 QoS satisfaction or non-satisfaction, the AF may further include information requesting notification of whether this is satisfied for 5 km from the departure.

As such, the server according to an embodiment of the present disclosure actively requests by transmitting QoS requirements, region information, threshold information, and so on in relation to QoS prediction, in which the server differs from a conventional server which does not provide QoS, a threshold, and information about a region requiring QoS prediction.

Further, the request may include various pieces of information required for the network to perform QoS prediction. For example, the various pieces of information may include the speed of the UE, information about a movement/departure time when the UE starts to move/leaves at a time other than a UE-requested time, and information about an application requiring QoS prediction (e.g., self-driving, platooning, or the like). When the application is platooning, all UEs participating in platooning or only a leading UE may subscribe to the AF in order to request QoS prediction to the network.

That is, the AF subscribes to a monitoring event notification service of the NWDAF, and the NWDAF receiving the request performs QoS prediction (or QoS satisfaction evaluation) before the UE enters a region to which the UE is expected to move. For information required for the QoS prediction, information collected from various sources such as a UE, an NG-RAN, a network function (NF), and an AF, history information that the NWDAF has, and so on may be used.

Upon receipt of the above-described request, the NWDAF notifies the AF of the event, when the NWDAF should/need to notify the AF. The notification may include information about one or more of a region and a time on which a QoS change occurs. Specifically, the notification message may explicitly or implicitly include one or more of the following pieces of information.

1) Information about an event that occurs.
2) Information about a region covered by the event occurrence/a valid region of the event occurrence.
3) Information about a PLMN covered by the event occurrence/a valid PLMN of the event occurrence.
4) Information about an expected time at which the event starts to occur.

For example, the notification message may indicate "PC5 QoS no longer meets the required level after 3 minutes". In another example, the notification message may indicate "the network connection is not supported 3 km ahead."

If the notification message indicates that the QoS is not satisfied, the notification message may further indicate a QoS level which may be satisfied. For example, a PC5 latency of 10 ms is supposed to be satisfied, and when the PC5 latency requirement is not satisfied, the notification message may further include information indicating that 12 ms may be satisfied.

The notification may be transmitted periodically or when an event satisfies a specific condition (e.g., when a latency is predicted/determined to be equal to or larger than a certain threshold value).

The AF may transmit the request message to the NWDAF after the UE subscribes to the AF for the monitoring event notification service (Step 1). The UE may explicitly or implicitly include information about the requested event in the subscription request, and the event may correspond to the above-described information included in the request.

Further, the subscription request may include one or more of the above-described pieces of information included in the request.

Subsequently, the AF notifies the UE of the event, when the NWDAF should/need to notify the AF (Step 4). The AF may provide the UE with information as it is and/or in a modified/processed form based on information received from the NWDAF.

The UE may take an appropriate action based on the notification (Step 5). Examples of the action are given as follows, and one or more actions may be performed together.

1) The UE stops running the application.
2) The UE unsubscribes from the monitoring event notification service through the AF.
3) As described in the step of notification from the AF, QoS is not satisfied, and if satisfactory QoS is provided, the UE transmits a response indicating whether the QoS is accepted is to the AF.
4) The UE requests the AF to notify, when QoS is satisfied again.

The AF then performs a subsequent operation based on a message received from the UE in the step in which the UE takes an appropriate action (Step 6).

In the above description, section 4.19 (Network Data Analytics) and section 5.2.11 (NWDAF Services) of TS 23.502 may be referred to for the basic operations for transmitting a request by the server and transmitting a notification by the NWDAF. That is, what is defined in TS 23.502 may be extended for the present disclosure. When the NF or AF requires the QoS prediction service, only the steps of transmitting a request by the server and transmitting a notification by the NWDAF may be performed in the above description. For example, if the AF that performs remote driving requires QoS prediction for a region in which the remote driving is performed for a target UE for the remote driving, the AF may take an action which has been described as taken by the UE in the step of taking an appropriate action by the UE.

Now, a description will be given of a case in which the serving PLMN of a UE is changed during QoS prediction, which accompanies a change of a PLMN to which a region for which QoS prediction is performed belongs during QoS prediction.

In a first example, a case in which an AF is operated by a third party will be described.

The AF, which interacts with the NWDAF of PLMN_A, should start to interact with the NWDAF of PLMN_B at some time point. The AF may determine the following based on one or more of information configured for the AF (e.g., configuration information indicating which region is served by which PLMN), information received from an NWDAF, information received from another NF, and information received from a UE. In the NWDAF, information about a region served by a PLMN to which the NWDAF belongs may be configured. Information about a region served by a neighbor PLMN may further be configured in the NWDAF.

a) A time when the interaction between the AF and the NWDAF of PLMN_B should be activated (started). (This may be earlier than a time when the serving PLMN of the UE changes from PLMN_A to PLMN_B, so that QoS for a route on which the UE moves may be predicted.)

b) A time when the interaction between the AF and the NWDAF of PLMN_A is deactivated (terminated). (This may simply be determined to be a time when the UE leaves PLMN_A, that is, a time when PLMN_A is no longer the serving PLMN of the UE.)

The interaction between the AF and the NWDAF may include requesting QoS prediction to the NWDAF and receiving a notification for QoS prediction (described above in the steps of requesting by the server and notifying by the NWDAF). This applies throughout the present disclosure.

The two time points of a) and b) described above may be the same or a) may be earlier than b). Particularly, although the UE is not yet connected to PLMN_B, that is, PLMN_B is not the serving PLMN of the UE, the AF may receive a notification from the NWDAF by performing QoS Prediction with the NWDAF for a region served by PLMN_B. In this case, the AF provides the UE with the information or notification received for PLMN_B through PLMN_A. That is, the UE receives QoS prediction-related information of the region of PLMN_B through PLMN_A which is the serving PLMN (via a PDU session or NAS connection of PLMN_A).

In a second example, an AF may be operated by an operator, that is, the AF may belong to a PLMN. While the AF of PLMN_A interacts with the NWDAF of PLMN_A, the AF of PLMN_B should start to interact with the NWDAF of PLMN_B at some time point. The AF may determine the following based on information about a region requiring QoS prediction by using one or more of information configured for the AF (e.g., configuration information indicating which region is served by which PLMN), information received from an NWDAF, information received from another NF, and information received from a UE. In the NWDAF, information about a region served by the PLMN to which the NWDAF belongs may be configured. Information about a region served by a neighbor PLMN may further be configured in the NWDAF.

A) A time when the AF of PLMN_B should activate (start) interaction with the NWDAF of PLMN_B. (This may be earlier than a time when the serving PLMN of the UE changes from PLMN_A to PLMN_B, so that QoS for a route on which the UE moves may be predicted.)

B) A time when the AF of PLMN_B deactivates (terminates) interaction with the NWDAF of PLMN_B. (This may simply be determined to be a time when the UE leaves PLMN_A, that is, a time when PLMN_A is no longer the serving PLMN of the UE.)

The two time points of A) and B) described above may be the same or A) may be earlier than B).

To enable the AF of PLMN_B to interact with the NWDAF of PLMN_B, a context/information related to the monitoring event should be provided from the AF of MNO_A to the AF of MNO_B. The time point at which the context/information is provided may be earlier than or coincide with the time point of A). When the AF of PLMN_A provides the context/information to the AF of PLMN_B, the AF of PLMN_A may include information about A) or it may be implicitly indicated that providing the context/information itself corresponds to a time at which A) should start.

How to exchange the context/information between the AFs may be determined in various manners as follows. The same or different methods may be used in the case where one of PLMN_A and PLMN_B is the home PLMN of the UE and in the case where the two PLMNs are visited PLMNs of the UE.

I) Provided directly between AFs

II) Provided through a PCF. The PCFs of the two PLMNs may be involved, or only the PCF of one of the two PLMNs may be involved.

III) Provided through the home PLMN of the UE. This may be provided through one or more of an NF to an AF belonging to the home PLMN, such as a UDM, a PCF, an NEF, and a V2X control function.

Particularly, although the UE is not yet connected to PLMN_B, that is, PLMN_B is not the serving PLMN of the UE, the AF of PLMN_B may receive a notification by performing QoS prediction with the NWDAF for a region served by PLMN_B. In this case, the AF of PLMN_B should provide the information or notification to the UE through PLMN_A since the UE is not yet connected to PLMN_B. To this end, the AF of PLMN_B provides the above information/notification to the AF of PLMN_A, and the AF of PLMN_A provides the UE with QoS prediction-related information for the region of PLMN_B through PLMN_A (via a PDU Session or NAS connection of PLMN_A). The information/notification may be provided from the AF of PLMN_B to the AF of PLMN_A based on one of the above-described methods of providing context/information related to a monitoring event.

When the UE moves from PLMN_A to PLMN_B, the AF of PLMN_B may transmit a message indicating that it is the serving AF of the UE. Alternatively/additionally, the AF of PLMN_A may transmit a message indicating that the AF of PLMN_B will be the serving AF.

When the PLMN of the UE is changed, a mechanism for determining a target PLMN may be used in the above description. This mechanism may be used only when there are multiple candidate PLMNs available as a target PLMN, and may be used even when there is only one candidate PLMN. The mechanism may be given as follows.

In the foregoing first example, that is, when an AF is operated by a third party, one of the following methods may be used. The AF provides the UE with a list of PLMNs (including information about one or more PLMNs) serving a region to which the UE is expected to move, and the UE selects one of the PLMNs and indicates the selected PLMN to the AF. The UE may select the PLMN based on configured information (e.g., unconditional selection of the home PLMN, based on a preferred list in the case of a VPLMN, or the like). The AF may perform QoS prediction for the candidate PLMN in advance and provide the UE with information about the QoS prediction. In addition, the AF may select only PLMNs which satisfy QoS and provide the UE with information about the selected PLMNs. Upon receipt of the information, the UE may use the information additionally to determine the target PLMN.

If the UE needs to move out of PLMN_A and select another PLMN, the UE moves to the selected PLMN. The AF selects one of the PLMNs serving the region to which the UE is expected to move and indicates the selected PLMN to the UE. The AF may make the choice based on various pieces of information (provided by a UE, NFs, an NWDAF, and so on). Further, the AF may perform QoS prediction on the candidate PLMN in advance and use information about the QoS prediction.

If the UE needs to move out of PLMN_A and select another PLMN, the UE moves to the PLMN selected and indicated by the AF.

In the foregoing second example, that is, when an AF is operated by an operator, the above description is understood/applied by replacing the AF with the AF of PLMN_A.

The above description has been given with the appreciation that an AF interacts with an NWDAF on a UE basis (which may be interpreted as per UE, UE associated, UE specific, or the like to provide a service to the UE based on the UE's request). However, the interaction may be performed for a plurality of UEs or on a region basis, not on a UE basis. For example, when a plurality of UEs traveling along a lane request QoS prediction to the network, regions for which QoS prediction should be performed for the plurality of UEs are similar or identical, and thus the AF may interact with the NWDAF based on the region for which QoS prediction is to be performed, not for each individual UE. In this case, when the AF receives a notification from the NWDAF, the AF may transmit the notification to all corresponding UEs.

The scenario in which an NWDAF is changed along with change of a PLMN and the scenario in which both an NWDAF and an AF are changed along with change of a PLMN have been described above. The above description is also applicable to a scenario in which although a PLMN is not changed, an NWDAF is changed within the single PLMN and a scenario in which both an NWDAF and an AF are changed within one PLMN. Further, while a function responsible for QoS prediction has been described as an NWDAF, the function may be another NF. In a V2X service, the function may be a V2X control function. Further, transmission and reception between an AF and an NWDAF may be performed through an NEF.

Figure 8:
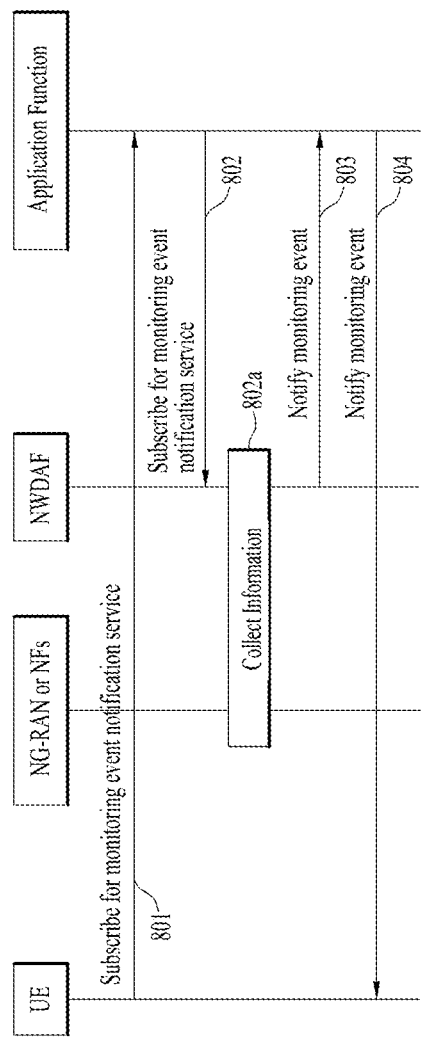
FIGS. 8, 9 and 10 are diagrams illustrating embodiments of the present disclosure.
Figure 9:
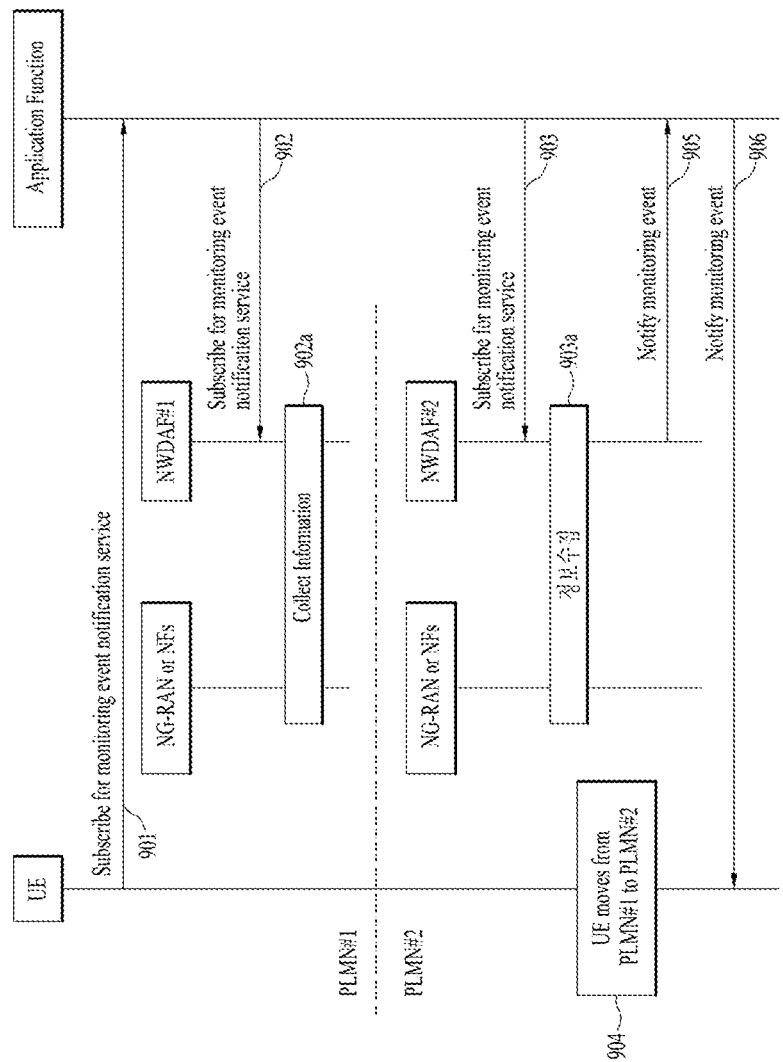
Figure 10:
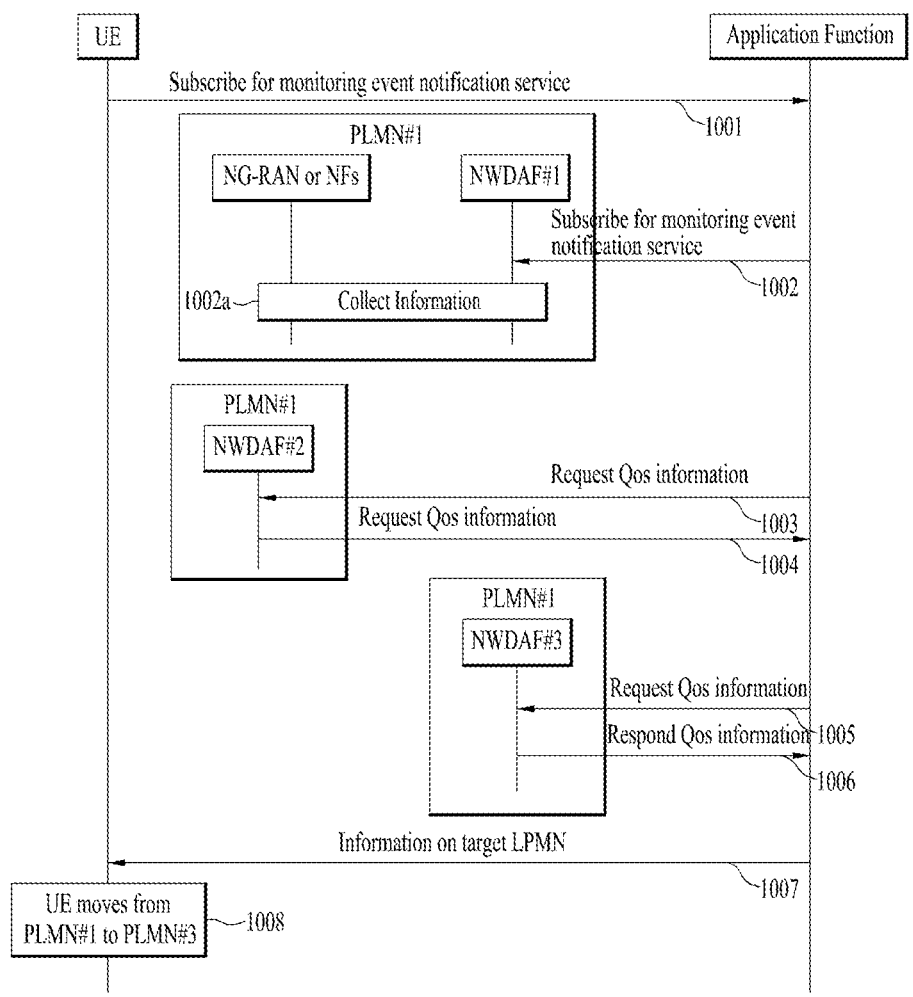

FIGS. 8, 9 and 10 illustrate signaling between network devices for QoS prediction according to embodiments of the present disclosure. The following description is based on the foregoing description. Particularly, the expression "refer to step 1" is written for a part requiring reference.

Referring to FIG. 8, a UE subscribes to an AF for a monitoring event notification service (S801). For details of this operation, refer to step 1 in the foregoing description. The AF is regarded as a V2X application server. Step S801 may be performed by a plurality of UEs. In this case, the AF may interact with an NWDAF for the plurality of UEs (e.g., a platooning unit) or on a region basis. Even when one UE performs step S801, the AF may also interact with the NWDAF on a region basis. The AF may determine a parameter which is to be provided when subscribing to the NWDAF in step S802, based on the unit of interaction with the NWDAF (one UE, a plurality of UEs, or a region).

The AF subscribes to the NWDAF for the monitoring event notification service (S802). For details, refer to step 2 in the foregoing description.

The NWDAF collects information from various sources (e.g., an NG-RAB, an NF, and so on) to perform QoS prediction (or QoS satisfaction evaluation) (S802*a*). The NWDAF performs QoS prediction (or QoS satisfaction evaluation) before the UE moves to a region to which the UE is expected to move. The NWDAF may use information that it has and information collected from other sources in performing QoS prediction. For details, refer to step 2 in the foregoing description.

In step S803, the NWDAF notifies the AF of an event, when the NWDAF should/need to notify the AF. For details, refer to step 3 in the foregoing description.

In step S804, the AF notifies the UE of the event, when the NWDAF should/need to notify the AF. For details, refer to step 4 in the foregoing description. If the AF has performed step S802 for a plurality of UEs, the AF notifies all of the UEs of the event. Subsequently, step 5 and step 6 in the foregoing description may be performed, when the NWDAF should/need to notify the AF.

FIG. 9 illustrates a procedure of predicting a route and collecting information about a next PLMN by an AF, when a PLMN is changed due to movement of a UE.

In step S901, a UE registers to PLMN #1. The UE then subscribes to an AF for a monitoring event notification service. For details, refer to step 1 as described above. The AF is regarded as a V2X application service. It is assumed that the AF is operated by a third party.

In step S902, the AF subscribes to the monitoring event notification service of the NWDAF of PLMN #1, NWDAF #1. For details, refer to step 2 as described above.

In step S902*a*, NWDAF #1 collects information from various sources (e.g., an NG-RAB, an NF, and so on) to perform QoS prediction (or QoS satisfaction evaluation). NWDAF #1 performs QoS prediction (or QoS satisfaction evaluation) before the UE moves to a region to which the UE is expected to move. NWDAF #1 may use information that it has and information collected from other sources in performing QoS prediction. For details, refer to step 2 in the foregoing description.

In step S903, the AF starts to interact with the NWDAF, NWDAF #2 of a PLMN to which the UE will move, PLMN #2 in consideration of a route in which the UE moves. For an operation of the AF in this scenario in which a PLMN to which a region subjected to QoS prediction belongs changes during the QoS prediction, the foregoing description will be referred to. For step S903*a*, step S902*a* is referred to.

In step S904, the UE moves from PLMN #1 to PLMN #2, and registers to PLMN #2. The UE may notify the AF that the PLMN has been changed.

In step S905, NWDAF #2 notifies the AF of an event, when the NWDAF should/need to notify the AF. For details, refer to step 3 in the foregoing description.

In step S906, the AF notifies the UE of the event, when the NWDAF should/need to notify the AF. For details, refer to step 4 in the foregoing description. Subsequently, step 5 and step 6 in the foregoing description may be performed, when the NWDAF should/need to notify the AF.

FIG. 10 also relates to a case in which a PLMN is changed, particularly to a method of determining candidate PLMNs capable of guaranteeing QoS in a query procedure, when there are a plurality of PLMNs on a route.

Specifically, referring to FIG. 10, a UE registers to PLMN #1 in step S1001. The UE then subscribes to an AF for a monitoring event notification service. For details, refer to step 1 as described above. The AF is regarded as a V2X application service. It is assumed that the AF is operated by a third party.

In step S1002, the AF subscribes to the monitoring event notification service of the NWDAF, NWDAF #1 of PLMN #1. For details, refer to step 2 as described above.

In step S1002*a*, NWDAF #1 collects information from various sources (e.g., an NG-RAB, an NF, and so on) to perform QoS prediction (or QoS satisfaction evaluation). NWDAF #1 performs QoS prediction (or QoS satisfaction evaluation) before the UE moves to a region to which the UE is expected to move. NWDAF #1 may use information that it has and information collected from other sources in performing QoS prediction. For details, refer to step 2 in the foregoing description. Continuously, the AF requests QoS prediction information to the NWDAF, NWDAF #2 of a target PLMN, PLMN #2 to which the UE will move in consideration of the route in which the UE moves in step S1003.

In step S1004, NWDAF #2 provides QoS information to the AF. While not shown, NWDAF #2 may collect information from various sources (e.g., an NG-RAN and an NF) to provide the QoS information.

In step S1005, the AF requests QoS prediction information to the NWDAF, NWDAF #3 of another target PLMN, PLMN #3 to which the UE will move in consideration of the route in which the UE moves.

In step S1006, NWDAF #3 provides QoS information to the AF. While not shown, NWDAF #3 may collect information from various sources (e.g., an NG-RAN and an NF) to provide the QoS information. For steps S1003 to S1006, the foregoing description is referred to. Subsequently, the AF selects one of PLMNs serving the region to which the UE is expected to move, that is, PLMN #2 and PLMN #3 and provides information about the selected PLMN to the UE in step S1007. The AF may use various pieces of information including the QoS information acquired in steps S1004 and S1006. It is assumed that the AF selects PLMN #3 capable of satisfying QoS and indicates PLMN #3 to the UE.

In step S1008, the UE moves from PLMN #1 to PLMN #3.

After selecting PLMN #3 in step S1007, the AF may subscribe to the monitoring event notification service of NWDAF #3.

Overview of Devices to Which the Present Disclosure is Applicable

Figure 11:
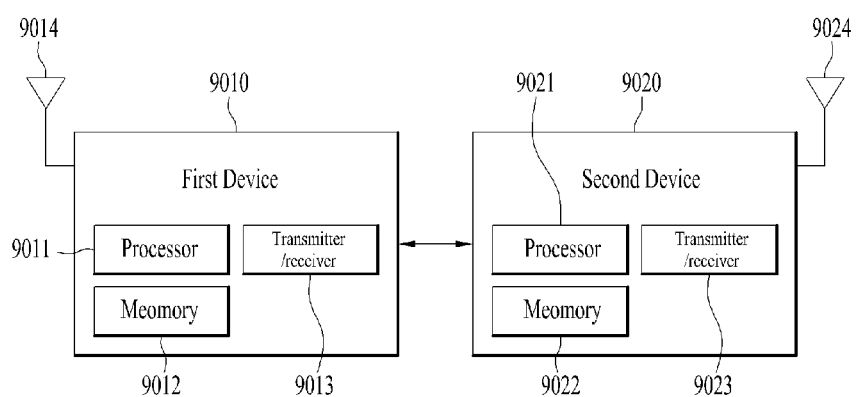
FIG. 11 is a block diagram illustrating the configurations of node devices according to an embodiment of the present disclosure.

Now, a description will be given of devices to which the present disclosure is applicable. FIG. 11 is a block diagram illustrating wireless communication devices according to an embodiment of the present disclosure.

Referring to FIG. 11, a wireless communication system may include a first device 9010 and a second device 9020.

The first device 9010 may be any of a base station, a network node, a transmitting UE, a receiving UE, a wireless device, a wireless communication device, a vehicle, a vehicle equipped with a self-driving function, a connected car, an unmanned aerial vehicle (UAV), an artificial intelligence (AI) module, a robot, an AR device, a VR device, a mixed reality (MR) device, a hologram device, a public safety device, an MTC device, an IoT device, a medical device, a FinTech device (or financial device), a security device, a weather/environmental device, a 5G service-related device, and a device related to a $4^{th}$ industrial revolution field.

The second device 9020 may be any of a base station, a network node, a transmitting UE, a receiving UE, a wireless device, a wireless communication device, a vehicle, a vehicle equipped with a self-driving function, a connected car, an UAV, an AI module, a robot, an AR device, a VR device, an MR device, a hologram device, a public safety device, an MTC device, an IoT device, a medical device, a FinTech device (or financial device), a security device, a weather/environmental device, a 5G service-related device, and a device related to a $4^{th}$ industrial revolution field.

The UE may be any of, for example, a portable phone, a smart phone, a laptop computer, a digital broadcasting terminal, a personal digital assistant (PDA), a portable multimedia player (PMP), a navigation device, a slate PC, a tablet PC, an ultrabook, and a wearable device (e.g., a smart watch, smart glasses, or a head mounted display (HMD)). The HMD may be, for example, a display device which may be worn around the head. For example, the HMD may be used for VR, AR, or MR.

The UAV may be, for example, an unmanned aircraft which flies by a wireless control signal. The VR device may include, for example, a device that renders objects or a background of a virtual world. The AR device may include, for example, a device which connects an object or background in a virtual world to an object or background in a real world. The MR device may include, for example, a device which merges an object or background in a virtual world with an object or background in a real world. The hologram device may include, for example, a device which renders 306-degree stereoscopic images by recording and reproducing stereoscopic information, relying on light interference occurring when two laser beams meet. The public safety device includes, for example, a relay device or device wearable on a user's body. The MTC device and the IoT device may include, for example, a device which does not require human intervention or manipulation. For example, the MTC device and the IoT device may include a smart meter, a vending machine, a thermometer, a smart bulb, a door lock, or various sensors. The medical device may include, for example, a device used for diagnosis, treatment, relief, or prevention of diseases. For example, the medical device may be a device used for the purpose of diagnosing, treating, relieving, or correcting injury or impairment. For example, the medical device may be a device used for the purpose of examining, replacing, or modifying a structure or a function. For example, the medical device may be a device for controlling pregnancy. For example, the medical device may include a device for treatment, a surgery device, an (in vitro) diagnosis device, or a hearing aid. The security device may be, for example, a device installed to avoid danger and maintain safety. For example, the security device may be a camera, a closed-circuit television (CCTV), a recorder, or a black box. The FinTech device may be, for example, a device which may provide a financial service such as mobile payment. For example, the FinTech device may include a payment device or a point of sales (PoS) terminal. The weather/environmental device may be, for example, a device which monitors or predicts weather/an environment.

The first device 9010 may include at least one processor such as a processor 9011, at least one memory such as a memory 9012, and at least one transmitter/receiver such as a transmitter/receiver 9013. The processor 9011 may perform the afore-described functions, procedures, and/or methods. The processor 9011 may implement one or more protocols. For example, the processor 9011 may implement one or more of radio interface protocols. The memory 9012 may be coupled to the processor 9011 and store various types of information and/or commands. The transmitter/receiver 9013 may be coupled to the processor 9011 and controlled to transmit and receive radio signals.

Specifically, the at least one processor of the first device may transmit a request related to QoS prediction subscription to an NWDAF, and receive a notification related to QoS prediction from the NWDAF.

The second device 9020 may include at least one processor such as a processor 9021, at least one memory such as a memory 9022, and at least one transmitter/receiver such as a transmitter/receiver 9023. The processor 9021 may perform the afore-described functions, procedures, and/or methods. The processor 9021 may implement one or more protocols. For example, the processor 9021 may implement one or more of radio interface protocols. The memory 9022 may be coupled to the processor 9021 and store various types of information and/or commands. The transmitter/receiver 9023 may be coupled to the processor 9021 and controlled to transmit and receive radio signals.

The memory 9012 and/or the memory 9022 may be coupled to the processor 9011 and/or the processor 9021 inside or outside the processor 9011 and/or the processor 9021, or to another processor by various techniques such as wired connection or wireless connection.

The first device 9010 and/or the second device 9020 may include one or more antennas. For example, an antenna 9014 and/or an antenna 9024 may be configured to transmit and receive radio signals.

The specific configurations of the first device 9010 and the second device 9020 may be implemented such that the details described in the various embodiments of the present disclosure may be applied independently or implemented such that two or more of the embodiments are applied at the same time. For clarity, a redundant description is omitted.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

The invention claimed is:

1. A method of transmitting and receiving, by a server in a wireless communication system, a signal related to quality of service (QoS) prediction, the method comprising:
transmitting a request related to QoS prediction subscription to a network data analytics function (NWDAF) by the server; and
receiving a notification related to QoS prediction from the NWDAF by the server,
wherein the request includes a QoS requirement related to the QoS prediction,
wherein the notification related to QoS prediction includes both information about a region for a QoS change and information about a time for the QoS change,
wherein based on a Public Land Mobile Network (PLMN) change in an area of the QoS prediction, the server determines a time when an interaction between the server and a NWDAF of a changed PLMN should be activated,
wherein the time when the interaction between the server and the NWDAF of the changed PLMN should be activated is earlier than a time of the PLMN change, to predict QoS in the changed PLMN, and
wherein the changed PLMN is included in a PLMN list which includes one or more PLMNs which satisfy QoS.

2. The method according to claim 1, wherein the QoS requirement includes at least one of a QoS packet delay budget (PDB), a packet error rate (PER), or a guaranteed bit rate (GBR).

3. The method according to claim 1, wherein the request includes information about a region for the QoS prediction.

4. The method according to claim 3, wherein the information about the region is at least one of route information, geographical area information, or coordinate information about the region.

5. The method according to claim 1, wherein the request includes QoS-related threshold level information.

6. The method according to claim 5, wherein the threshold level information includes a QoS key performance indicator (KPI).

7. A server configured to transmit and receive a signal related to quality of service (QoS) prediction in a wireless communication system, the server comprising:
at least one processor; and
at least one computer memory coupled to the processor and storing instructions that, when executed by the at least one processor, perform operations comprising:
transmitting a request related to QoS prediction subscription to a network data analytics function (NWDAF); and
receiving a notification related to QoS prediction from the NWDAF,
wherein the request includes a QoS requirement related to the QoS prediction, and
wherein the notification related to QoS prediction includes both information about a region for a QoS change and information about a time for the QoS change,
wherein based on a Public Land Mobile Network (PLMN) change in an area of the QoS prediction, the server determines a time when an interaction between the server and a NWDAF of a changed PLMN should be activated,
wherein the time when the interaction between the server and the NWDAF of the changed PLMN should be activated is earlier than a time of the PLMN change, to predict QoS in the changed PLMN, and
wherein the changed PLMN is included in a PLMN list which includes one or more PLMNs which satisfy QoS.

8. The server according to claim 7, wherein the QoS requirement includes at least one of a QoS packet delay budget (PDB), a packet error rate (PER), or a guaranteed bit rate (GBR).

9. The server according to claim 7, wherein the request includes information about a region for the QoS prediction.

10. The server according to claim 9, wherein the information about the region is at least one of route information, geographical area information, or coordinate information about the region.

11. The server according to claim 7, wherein the request includes QoS-related threshold level information.

12. The server according to claim 11, wherein the threshold level information includes a QoS key performance indicator (KPI).

* * * * *